July 22, 1958 W. A. ENGSTROM 2,844,323
THERMOSTAT FOR ENGINE COOLING SYSTEMS
Filed March 15, 1952 2 Sheets-Sheet 1

INVENTOR.
William A. Engstrom
BY Hauke & Hardesty
Attorneys.

July 22, 1958 W. A. ENGSTROM 2,844,323
THERMOSTAT FOR ENGINE COOLING SYSTEMS
Filed March 15, 1952 2 Sheets-Sheet 2
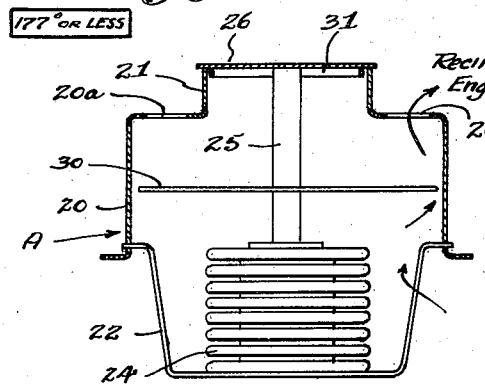
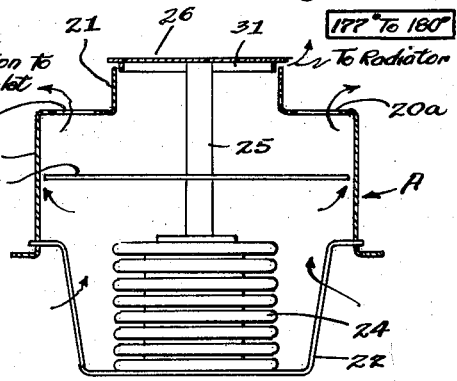
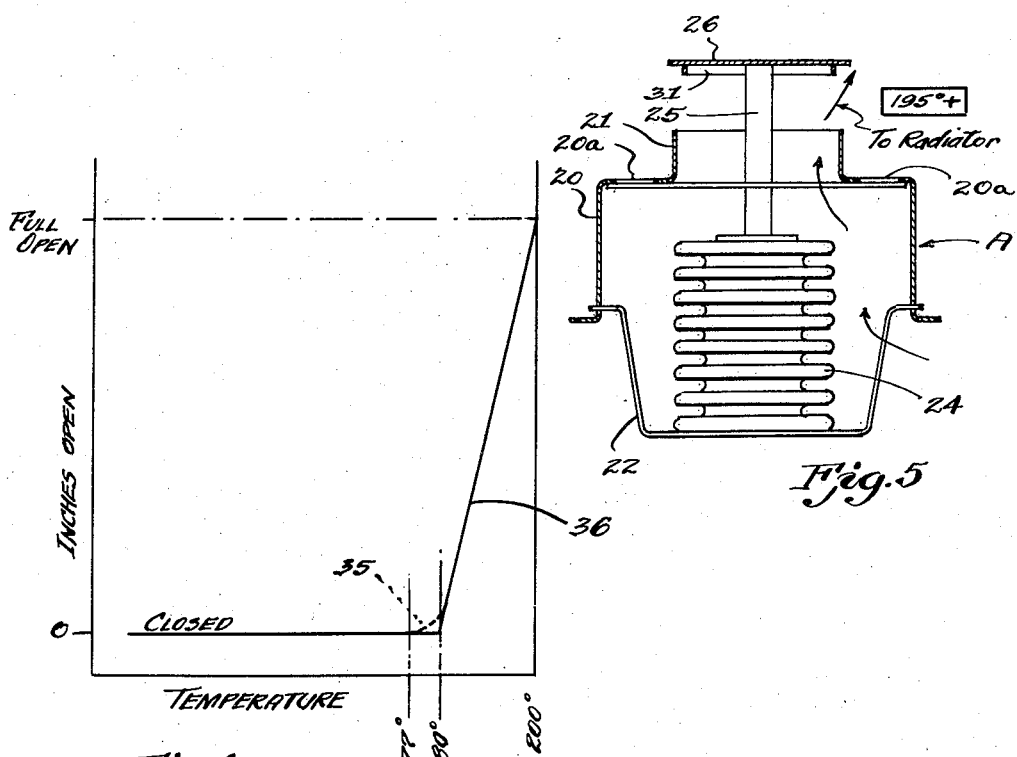
INVENTOR.
William A. Engstrom
BY Hauke + Haiderly
Attorneys.

United States Patent Office 2,844,323
Patented July 22, 1958

2,844,323

THERMOSTAT FOR ENGINE COOLING SYSTEMS

William A. Engstrom, Muskegon, Mich., assignor to Continental Motors Corporation, Muskegon, Mich., a corporation of Virginia Application March 15, 1952, Serial No. 276,844

3 Claims. (Cl. 236—34.5)

My invention relates to engines and more particularly to the thermostat incorporated in the engine cooling system. In conventional engine cooling systems, a thermostat is employed to shut off the connection between the engine cooling jacket and the radiator until such time as the temperature of the cooling water reaches a predetermined temperature.

A great deal of trouble has been experienced with these thermostats wearing out, due to their being continually opened and closed. Each time the valve on the thermostat approaches the seat, the engine vibrations bring about a wearing condition between the valve and the seat. Experience has shown that the life of these thermostats is relatively short as compared with the life of most accessories used on an internal combustion engine. A stuck thermostat valve results in an engine overheating and causes serious damage to the engine parts, and likewise when a thermostat valve is stuck open, it results in inefficient engine operation and a cold engine is not properly lubricated.

It is the object of my invention to overcome the difficulties aforesaid by providing an improved thermostat constructed for creating a small vernier opening at the beginning of the thermostat action. The normal action of my improved thermostat is to open from this partial position to full open position and it remains adjusted to the load and speed of the engines, and the thermostat operates at the one correct position for maintaining temperatures of the cooling system at that load and speed.

With this improved construction, the wear of the thermostat valve is maintained at a minimum resulting in longer life and a more accurate and positive control of water temperature.

For a more detailed understanding of my invention, reference may be had to the accompanying drawings illustrating a preferred embodiment of the invention in which like parts are referred to by like characters throughout the several views, and in which—

Figs. 3, 4 and 5 are diagrammatic sectional views of the thermostat showing its operation, and Fig. 6 is a showing of a curve representing the opening area in inches plotted against temperature.

Figures 1, 2:
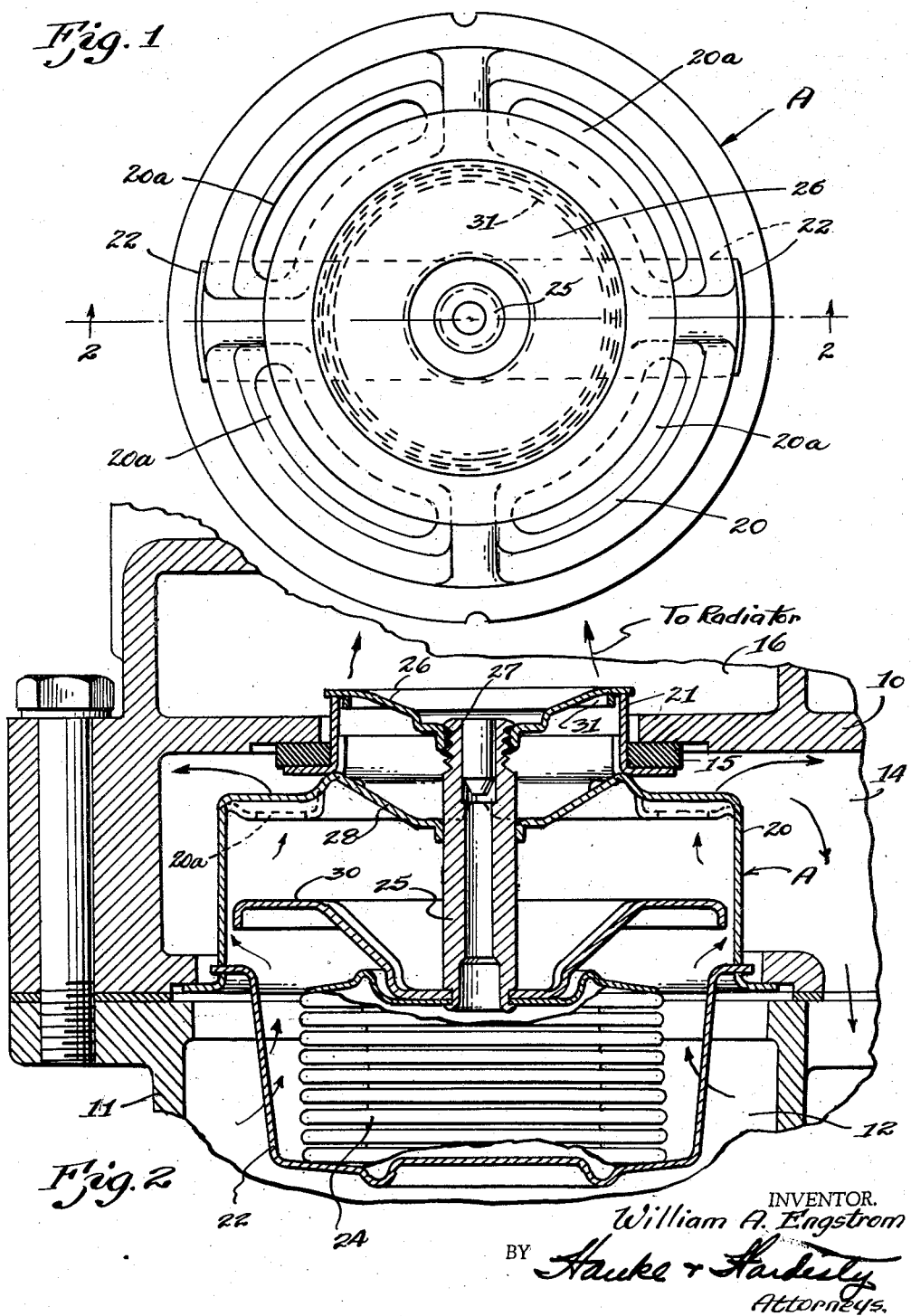
Fig. 1 is a plan view of my improved thermostat.
Fig. 2 is a transverse sectional view thereof taken substantially on the line 2—2 of Fig. 1 and showing the thermostat as mounted in a conventional engine.

The thermostat "A" is preferably mounted in the cylinder head 10 of a conventional internal combusiton engine having a cylinder block 11 provided with a water jacket 12 opening communicating with the cylinder head jacket 14. The jacket 14 is exhausted to the water pump inlet (not shown) and thence to the cylinder block jacket. A suitable gasket 15 is employed to seal off the cylinder head jacket 14 from the hot water outlet connection 16 connected with a conventional radiator (not shown) which is connected in the usual way with the engine cooling passages or jackets.

The thermostat comprises a shell or body portion 20 formed with a neck or tubular extension 21 projecting into the outlet connection or passage 16. (See Fig. 2). A strap or bracket 22 is carried by the shell 20 and supports a Sylphon bellows 24 or other suitable temperature responsive device. The bellows carries a shaft or stem 25, and a valve 26 is secured to the outer end of this stem as at 27, said valve being constructed to seat against the open end of the extension 21. The shell 20 carries inwardly extending arms 28 providing a bearing for centering the stem 25 in the shell. A disc or plate 30 is secured to the stem and is concentrically disposed within the shell or body portion 20, said disc being constructed to move axially of the shell 20 as said bellows is expanded or contracted, said bellows being filled with a suitable fluid subject to expansion and contraction in response to thermal changes of the water circulated through the engine cooling system.

The valve 26 is provided with an annular flange 31 of slightly smaller diameter than the internal diameter of the outlet extension 21. The shell or casing 20 is provided with the outlet openings 20a. As the bellows 24 is expanded, it moves the disc or plate 30 into engagement with the shell 20 to close the openings 20a, thus completely shutting off flow of water from the interior of the shell 20 to the cylinder head jacket 14.

In operation the thermostat is constructed to commence its opening movement when the temperature of the water circulated past said bellows 24 reaches a predetermined temperature of about 177° F., for example. At this time, the valve disc 26 begins to lift off its seat providing a small annular opening about the annular flange 31 (see Figs. 4 and 6). This small vernier opening is substantially constant through the water temperature range of from about 177° F. to about 180° F. The use of this small restricted opening provides for a gradual lift curve as shown by the dotted line 35 in Fig. 6. A very little of the hot water is thus circulated through the engine radiator, while most of the water is still spilled into the jacket 14 for recirculation through the engine jacket. But as the water temperature increases to about 180° F., the valve begins to lift rapidly, increasing the opening in inches very rapidly and it is fully open at about 200° F. (see curve 36 of Fig. 6).

At this time, the disc valve 30 is raised into engagement with the shoulder on the annular flat portion of the shell 20, and closes the openings 20a, thus shutting off communication between the interior of shell 20 and the jacket 14 (see Figs. 5 and 6), and all the water is now circulated through the engine radiator.

Likewise, as the water temperature drops, the valve 30 drops and the valve 26 which ordinarily snaps shut, is thus moved rapidly towards its seat but on approaching its seat, its speed is very rapidly decelerated so that it eventually seats itself very gradually, thus eliminating most of the valve wear and conservatively approximately doubling the life of the thermostat.

With this vernier opening at the beginning of the thermostat action, cold water is gradually brought into the engine and the engine temperature remains adjusted to the load and speed and the thermostat operates at one correct position for maintaining temperature at that load and speed. The present device admits cold water to the engine very slowly at first. Usually, the thermostats will continually open and close, particularly when running under light engine load and cold outside air conditions, but in the present construction the closing action is slowed up at the moment of actual closing. This construction eliminates to a large extent the surge of hot and cold water through the engine, thus materially serving to improve engine performance and provide for longer life of both engine and especially the thermostat.

It will be apparent to those skilled in the art to which my invention pertains that various changes and modifications may be made herein without departing from the spirit of the invention or from the scope of the appended claims.

I claim:

1. In a liquid cooled internal combustion engine having a cooling system and a radiator connected with said engine cooling system, a thermostat supported in said engine cooling system and comprising a thermally responsive expansible bellows immersed in the water in said engine cooling system, a casing having hot water outlet means connected with the radiator, and valve means connected with said thermally responsive expansible bellows and associated with said hot water outlet means and operable to open said outlet means in response to a predetermined increase in temperature of the water in said engine cooling system, said valve means provided with a cylindrical flange extending into and disposed concentrically with respect to said pipe and having a predetermined axial length to provide and maintain a constant fixed small opening for a relatively small range of water temperature rise substantially immediately subsequent to the initial opening of said valve means and operable when said flange moves out of said hot water outlet to rapidly and progressively open in response to further temperature rise of the coolant in said engine cooling system.

2. In a liquid cooled internal combustion engine having a cooling system and a radiator connected with said engine cooling system, a thermostat supported in said engine cooling system and comprising a thermally responsive expansible bellows immersed in the water in said engine cooling system, a casing having hot water outlet means connected with the radiator, and valve means connected with said thermally responsive expansible bellows and associated with said hot water outlet means and operable to open said outlet means in response to a predetermined increase in temperature of the water in said engine cooling system, said valve means constructed and arranged to provide and maintain a constant fixed small opening for a relatively small range of water temperature rise substantially immediately subsequent to the initial opening of said valve means and operable to rapidly and progressively open in response to further temperature rise of the coolant in said engine cooling system, said outlet means comprising a cylindrical pipe section, and said valve means comprising a disc seating on the open outlet end of said pipe to close same, said disc having an annular axially extending cylindrical flange concentrically disposed in said pipe and slightly spaced inwardly thereof to provide an annular opening of constant fixed area for a portion of the initial opening movement of said valve, said valve opening only progressively increasing in area rapidly as the valve is opened further and the axial flange is moved beyond the open end of said pipe.

3. In a liquid cooled internal combustion engine having a cooling system and a radiator connected with said engine cooling system, a thermostat supported in said engine cooling system and comprising a thermally responsive expansible bellows immersed in the water in said engine cooling system, a casing having hot water outlet means connected with the radiator, and valve means connected with said thermally responsive expansible bellows and associated with said hot water outlet means and operable to open said outlet means in response to a predetermined increase in temperature of the water in said engine cooling system, said valve means constructed and arranged to provide and maintain a constant fixed small opening for a relatively small range of water temperature rise substantially immediately subsequent to the initial opening of said valve means and operable to rapidly and progressively open in response to further temperature rise of the coolant in said engine cooling system, said outlet means comprising a cylindrical pipe section, and said valve means comprising a disc seating on the open outlet end of said pipe to close same, said disc having an annular axially extending cylindrical flange substantially concentrically disposed in said pipe and slightly spaced inwardly thereof to provide an annular opening of substantially constant area for a portion of the initial opening movement of said valve, said valve opening increasing in area rapidly as the valve is opened further and the axial flange is moved beyond the open end of said pipe, said annular flange having an axial length sufficient to provide for such opening of constant fixed area for about a three degree range in the temperature rise of the coolant in said engine cooling system.

References Cited in the file of this patent

UNITED STATES PATENTS

| | | |
|---|---|---|
| 1,223,078 | Lammert | Apr. 17, 1917 |
| 1,401,468 | Fitts | Dec. 27, 1921 |
| 1,929,973 | Haley | Oct. 10, 1933 |
| 2,243,714 | Mayo | May 27, 1941 |
| 2,308,861 | Clifford | Jan. 19, 1943 |
| 2,336,858 | Giesler | Dec. 14, 1943 |

FOREIGN PATENTS

| | | |
|---|---|---|
| 219,734 | Switzerland | Feb. 28, 1942 |